(12) United States Patent
McAdams et al.

(10) Patent No.: US 9,375,697 B2
(45) Date of Patent: Jun. 28, 2016

(54) EXTRACTION CELL ASSEMBLY WITH QUICK-RELEASE SEAL REMOVAL

(71) Applicant: DIONEX CORPORATION, Sunnyvale, CA (US)

(72) Inventors: Michael J. McAdams, Los Gatos, CA (US); Sm Rahmat Ullah, Fremont, CA (US); Kannan Srinivasan, Tracy, CA (US)

(73) Assignee: DIONEX CORPORATION, Sunnyvale, CA (US)

( * ) Notice: Subject to any disclaimer, the term of this patent is extended or adjusted under 35 U.S.C. 154(b) by 0 days.

(21) Appl. No.: 14/206,227

(22) Filed: Mar. 12, 2014

(65) Prior Publication Data

US 2015/0258521 A1    Sep. 17, 2015

(51) Int. Cl.
| | |
|---|---|
| *B01L 99/00* | (2010.01) |
| *B01J 19/00* | (2006.01) |
| *B01D 11/02* | (2006.01) |
| *B01L 3/00* | (2006.01) |
| *B01J 19/02* | (2006.01) |
| *B23P 6/00* | (2006.01) |

(52) U.S. Cl.
CPC .............. *B01J 19/0053* (2013.01); *B01D 11/02* (2013.01); *B01J 19/02* (2013.01); *B01L 3/50825* (2013.01); *B01L 3/563* (2013.01); *B01L 3/565* (2013.01); *B23P 6/00* (2013.01); *B01J 2219/0245* (2013.01); *B01J 2219/24* (2013.01); *B01L 2200/0689* (2013.01); *B01L 2300/048* (2013.01); *B01L 2300/0681* (2013.01); *B01L 2400/0478* (2013.01); *Y10T 29/4973* (2015.01); *Y10T 29/49822* (2015.01)

(58) Field of Classification Search
CPC ................ G01N 2001/4061; B01L 2300/0681
USPC ......................................................... 422/535
See application file for complete search history.

(56) References Cited

U.S. PATENT DOCUMENTS

| | | |
|---|---|---|
| 5,647,976 A | 7/1997 | Rothe et al. |
| 5,660,727 A | 8/1997 | Gleave et al. |
| 5,785,856 A | 7/1998 | Gleave et al. |
| 5,843,311 A | 12/1998 | Richter et al. |

(Continued)

FOREIGN PATENT DOCUMENTS

| | | |
|---|---|---|
| DE | 3605384 A1 | 8/1987 |
| EP | 0248379 A2 | 12/1987 |

OTHER PUBLICATIONS

DIONEX, AS Autosampler Operator's Manual, Doc. No, 065051, Rev. 03, Jan. 2008, 356 pages.

*Primary Examiner* — Paul Hyun
(74) *Attorney, Agent, or Firm* — Victor Johnson (57) ABSTRACT

An extraction cell assembly includes a cell body, a cap assembly having a cap body and a cap insert, a bed support and a seal. The cap body is removably secured to the cell body and includes a throughbore and a peripheral wall. The cap insert includes a plunger, a peripheral flange extending outwardly from the plunger, and a recess disposed within the plunger. The flange and plunger of the cap insert are slidably received, respectively, inside the peripheral wall and throughbore of the cap body. The bed support is removably received within the recess. The seal is removably received within the throughbore. The seal forms a fluid seal between the cell body and the cap assembly when the cap assembly is secured to the cell body. A method of using the extraction cell assembly is also disclosed.

19 Claims, 8 Drawing Sheets

(56) References Cited

U.S. PATENT DOCUMENTS

| | | | |
|---|---|---|---|
| 5,863,260 A * | 1/1999 | Butler et al. | 473/305 |
| 5,879,634 A | 3/1999 | Ford | |
| 6,803,237 B2 * | 10/2004 | Manganini et al. | 436/175 |
| 2003/0175166 A1 | 9/2003 | Schluter | |
| 2008/0110814 A1 | 5/2008 | Izzo et al. | |
| 2010/0202929 A1 | 8/2010 | Renslow | |

* cited by examiner

EXTRACTION CELL ASSEMBLY WITH QUICK-RELEASE SEAL REMOVAL

BACKGROUND OF INVENTION

1. Field of Invention

This application relates, in general, to an extraction cell assembly with quick-release seal removal, and more particularly to a cap assembly for use with Accelerated Solvent Extraction (ASE) cells that allows easy removal and replacement of a seal and/or bed support by a user without the use of tools.

2. Description of Related Art

Analyses of organic compounds are becoming increasingly important. It is also necessary to isolate and analyze trace levels of compounds from a variety of sample matrices such as soil, sediments, food, animal tissue, fruits and vegetables. Sample preparation constitutes an important step prior to analysis. Extraction is an integral part of sample preparation. Accelerated Solvent Extraction (ASE) is a technique used for extracting the analytes of interest using a solvent at elevated temperatures and pressures. The elevated pressure elevates the boiling point of the solvent thereby allowing faster extraction to be conducted at relatively high temperatures. Thus the extraction process is significantly faster than traditional methods such as Soxhlet extraction. A cell to hold the sample as well as a filter, for example, a frit, are integral components of an ASE instrument. The cell facilitates the extraction and in-line filtering.

Figure 1:
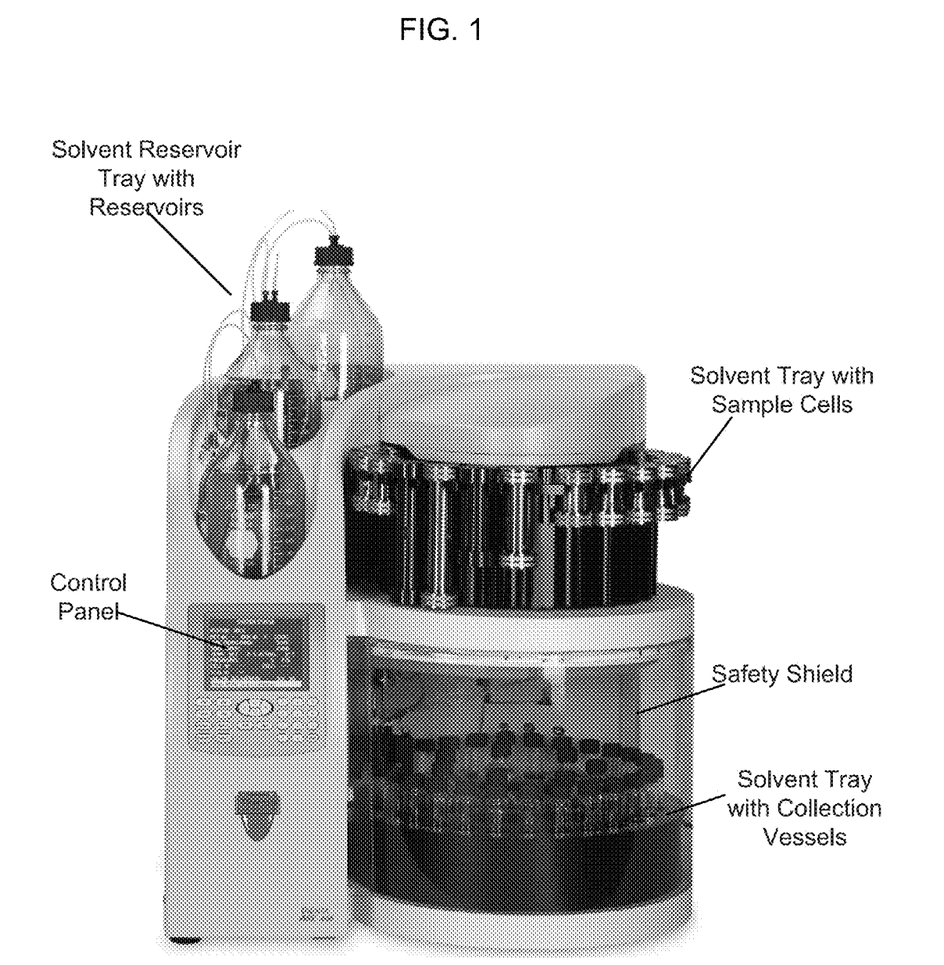
FIG. 1 is a front view of a Thermo Scientific Dionex™ ASE™ 350 Accelerated Solvent Extractor, an exemplary device that may utilize existing sample cells as well as extraction cell assemblies in accordance with the present invention.

ASE extractions occur at relatively high pressures (e.g., 1500 psi), and operating at such high pressures requires careful design of the extraction cell. An extraction cell generally includes a conduit or main cell body that has end caps sealing the cell body (see, e.g., sample cells, FIG. 1). The role of the end cap is to seal the cell body and to facilitate easy access into the cell. The end cap also includes a seal and a bed support or filter that retains the solid components within the cell. Facile replacement of these parts would add to ease of use from a user perspective.

Figure 2:
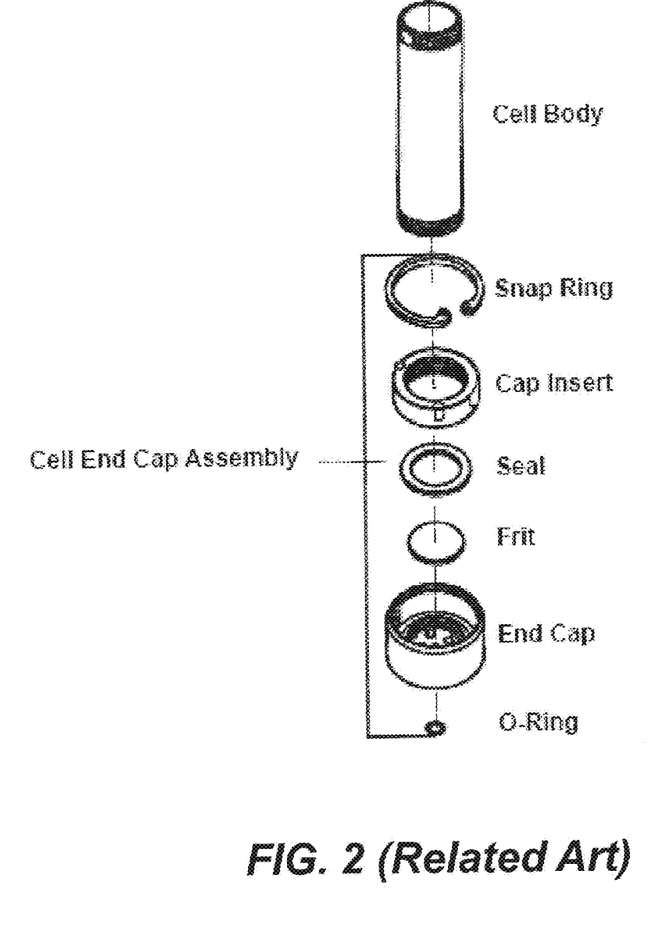
FIG. 2 is an exploded view of a current cell assembly that may be used with the device of FIG. 1.
Figure 3:
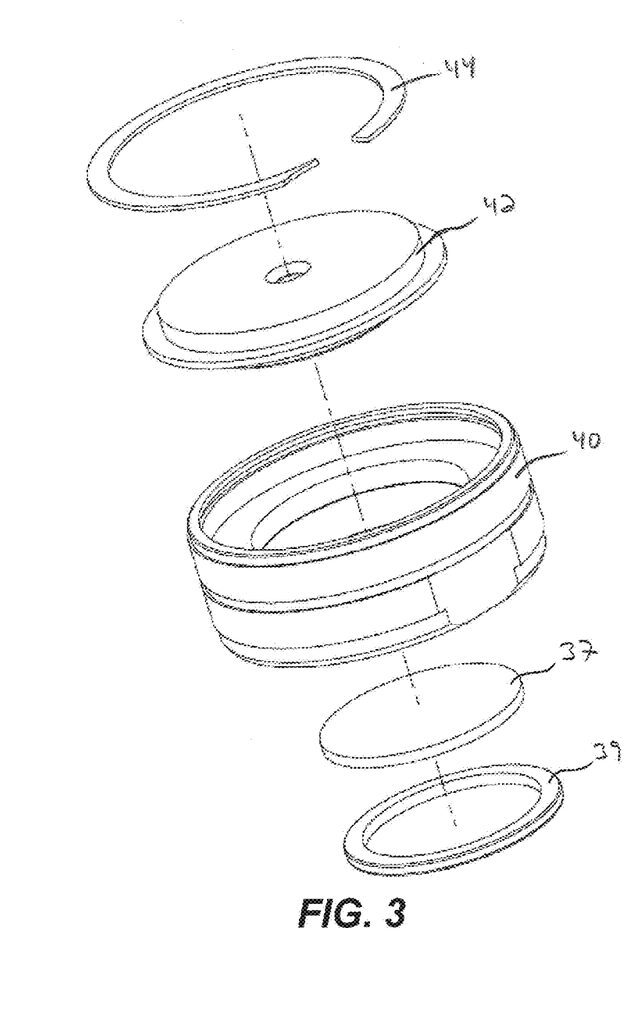
FIG. 3 is an exploded view of an exemplary extraction cell assembly in accordance with the present invention, which assembly may also be used with the device of FIG. 1.
Figure 4:
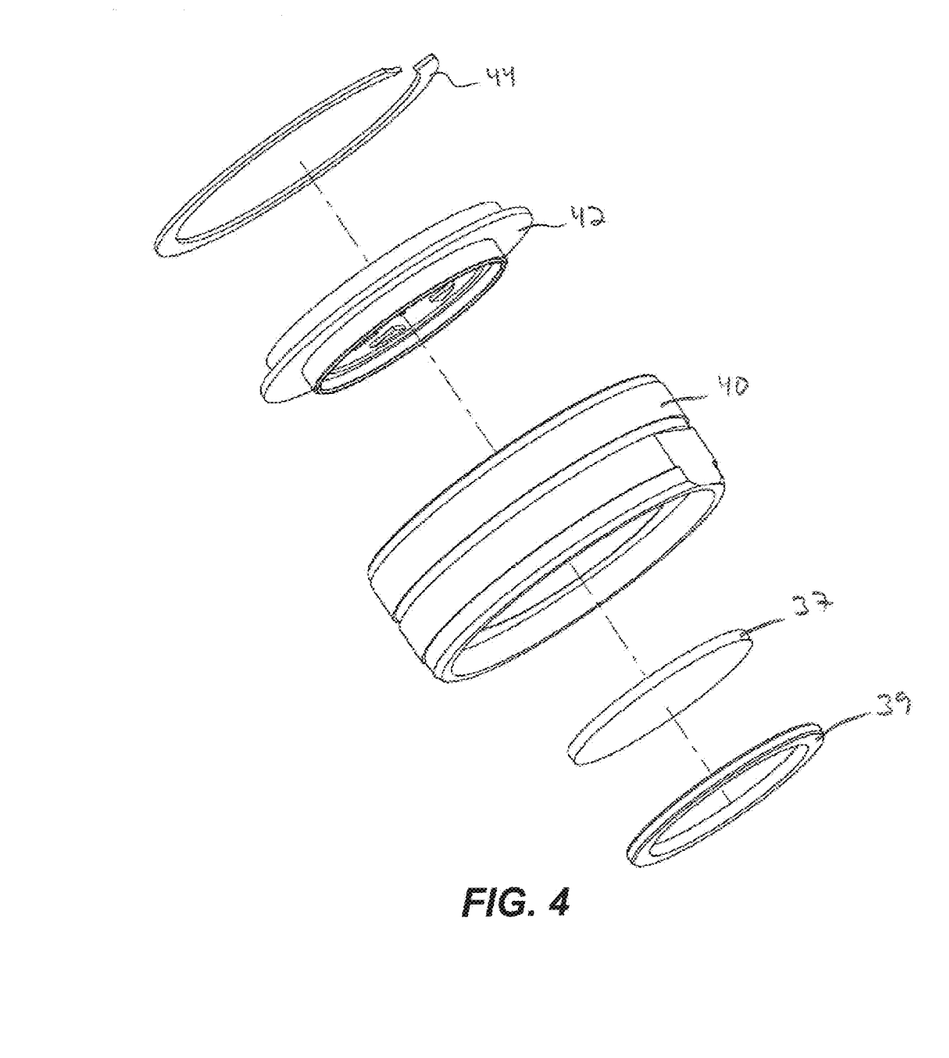
FIG. 4 is another exploded view of the exemplary extraction cell assembly of FIG. 3.
Figure 5:
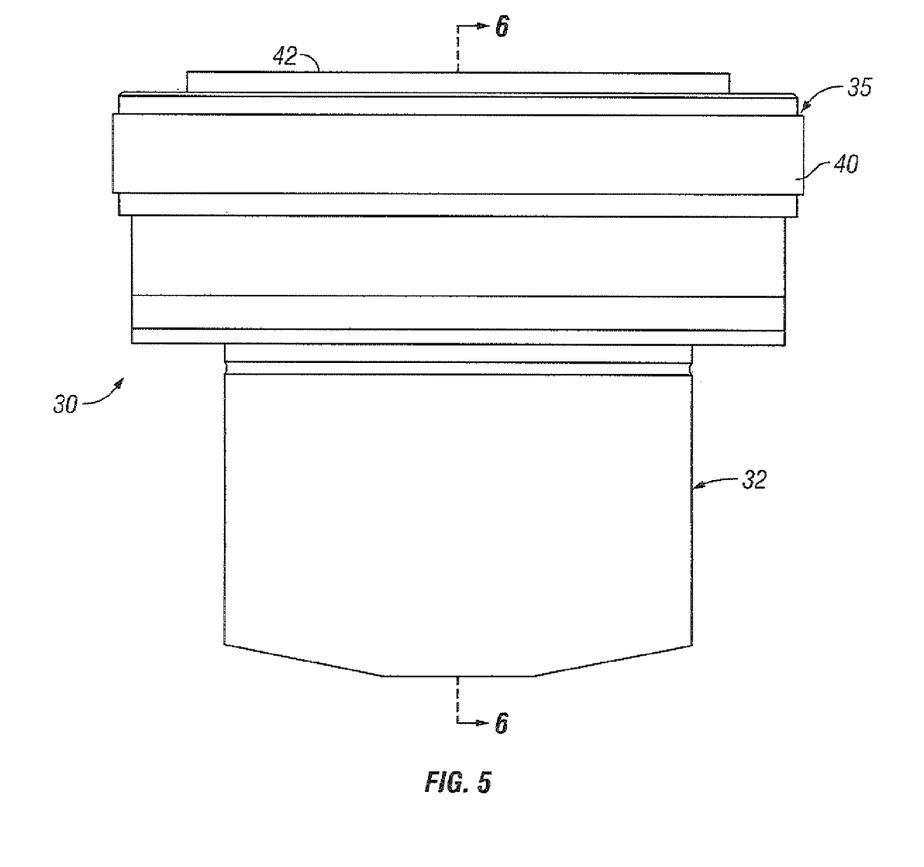
FIG. 5 is a side view of the exemplary extraction cell assembly of FIG. 3, shown mounted on a cell body in accordance with the present invention.

With reference to FIG. 2, current cell assemblies generally include a cell body and a pair of cell end cap assemblies (only a bottom end cap is shown in FIG. 2). With continued reference to FIG. 2, each end cap assembly includes, from bottom to top, an end cap, a frit, a seal, an annular cap insert, and a snap ring to lock everything within the end cap.

An exemplar of an existing cell assembly is described U.S. Pat. No. 5,647,976 which shows a high pressure and temperature cell for solvent extraction.

Such current cell assemblies provide robust end caps that seal cell assemblies properly at elevated temperature and especially at elevated pressures (e.g., 1500 psi). The cell body is generally threaded inside the cap insert, but the liquid seal occurs between the edge of the cell body against a seal. This sealing mechanism allows the cell to be operated at high pressure without any solvent leaks.

The seal and the frit need periodical replacement after extractions and/or after they become dirty from exposure to the sample conditions. And for trace analysis, the user needs to replace the components after each analysis to minimize carry over.

A user needs to disassemble the entire end cap assembly to replace either the seal or the frit in the existing current cell assemblies. And to disassemble, a user must use an appropriate snap ring tool to remove the snap ring and thus release the cap insert, seal and frit from the end cap.

One will appreciate that the appropriate snap ring tool must be readily available, and that use of the snap ring tool requires a degree of skill and manual dexterity to remove and properly install the snap ring. Dislodging the seal and the bed support after prolonged use may further require the user to tap the end cap to release the seal and the bed support.

In light of the foregoing, it would be beneficial for an end cap design that facilitates easy removal and replacement of the end cap components.

BRIEF SUMMARY

One aspect of the present invention is directed to an extraction cell assembly including a cell body, a cap assembly, a bed support and a seal. The cell body defines a cell chamber. The cap assembly includes a cap body and a cap insert. The cap body is removably secured to the cell body and includes a throughbore and a peripheral wall. The cap insert includes a plunger, a peripheral flange extending outwardly from the plunger, and a recess disposed within the plunger. The flange and plunger of the cap insert are slidably received, respectively, inside the peripheral wall and throughbore of the cap body. The bed support is removably received within the recess. The seal is removably received within the throughbore. The seal forms a fluid seal between the cell body and the cap assembly when the cap assembly is secured to the cell body.

The cap body may be threadably secured to the cell body.

The extraction cell assembly may further include an orifice extending from the recess through the cap insert to provide external fluid communication with the cell chamber.

The extraction cell assembly may further include a retaining ring for locking the peripheral flange of the cap insert within the peripheral wall of the cap body.

The bed support may be a frit.

The seal may be formed of a thermoplastic polymer.

The seal may be formed of polyether ether ketone (PEEK).

The seal may be an annular seal including a first surface abutting against a lip of the plunger surrounding the recess, and a second surface abutting against an end of the cell body.

The seal may frictionally engage the throughbore to secure the support bed within the recess.

The extraction cell assembly may be configured such that pressing the plunger into the throughbore of the cap body may push the seal out of frictional engagement with the throughbore thereby releasing the support bed.

Another aspect of the present invention is directed to a cap assembly including a cap body, a cap insert, and a retainer. The cap body is configured to be removably secured to a cell body and includes a throughbore and a peripheral wall. The cap insert includes a plunger, a peripheral flange extending outwardly from the plunger, and a recess disposed within the plunger. The flange and plunger of the cap insert are slidably received, respectively, inside the peripheral wall and throughbore of the cap body. The retaining ring locks the peripheral flange of the cap insert within the peripheral wall of the cap body. The recess is configured to removably receive a bed support therein. The throughbore is configured to removably receive a seal that frictionally engages the throughbore and secures the support bed within the recess. The plunger is configured to remove the seal by pushing the seal from the throughbore. The cap assembly is configured to position the seal to form a fluid seal with a cell body when the cap assembly is secured to the cell body.

At least one of the cap body and the cap insert may be formed of stainless steel.

One of the cap body and the cap insert may be formed of a first stainless steel, and the other of the cap body and the cap insert may be formed of a second stainless steel different than the first stainless steel.

The cap assembly may further include a bed support in the form of a frit.

The cap assembly may further include a seal is formed of a thermoplastic polymer.

The seal may be formed of polyether ether ketone (PEEK).

The seal may be an annular seal including a first surface abutting against a lip of the plunger surrounding the recess.

The cap assembly may be configured such that pressing the plunger into the throughbore of the cap body pushes the seal out of frictional engagement with the throughbore thereby releasing the support bed.

Yet another aspect of the present invention is directed to a method of servicing an extraction cell assembly including a cell body defining a cell chamber and a cap assembly threaded thereon. The method includes unthreading the cap assembly from the cell body, axially pressing a cap insert of the cap assembly relative to cap body of the cap assembly, whereby a plunger of the cap insert pushes a seal frictionally engaged within a throughbore from the throughbore, and removing a bed support from a recess formed within the plunger.

The method may further include placing another bed support in the recess formed within the plunger, inserting another seal into the throughbore to secure the another bed support within the recess, and threading the cap assembly on the cell body to properly seat the seal and bed support.

A further aspect of the present invention is directed to a cap body for use with a cap assembly including a retainer and a cap insert. The cap body includes a threaded body configured to be removably secured to a cell body, a throughbore configured to slidably receive a plunger of the cap insert, a peripheral wall configured to slidably receive a peripheral flange of the cap insert extending outwardly from the plunger, and a retaining groove configured to releasably receive the retainer to releasably and slidably secure the peripheral flange of the cap insert within the peripheral wall of the cap body. The throughbore is configured to removably receive a seal that (i) frictionally engages the throughbore to secure a support bed within a recess disposed in the plunger of the cap insert and (ii) forms a fluid seal with a cell body when the cap body is secured to the cell body.

An extraction cell assembly may include the cap body, a cell body defining a cell chamber, a cap insert including plunger, a peripheral flange, and a recess, a bed support removably received within the recess, and a seal removably received within the throughbore, wherein the seal forms a fluid seal between the cell body and the cap assembly when the cap assembly is secured to the cell body.

A still further aspect of the present invention is directed to a cap insert for use with a cap assembly including a retainer and a cap body configured to be removably secured to a cell body. The cap insert includes a plunger configured to be slidably received by a throughbore of the cap body, a peripheral flange extending outwardly from the plunger and configured to be slidably received within a peripheral wall of the cap body and removably retained within the peripheral wall by the retainer, and a recess disposed within the plunger and configured to removably receive a bed support therein. The plunger is configured to remove a seal frictionally engaged within the throughbore of the cap body by pushing the seal from the throughbore when the cap insert is pushed into the cap body, and the plunger is configured to position the seal to form a fluid seal with a cell body when the cap assembly is secured to the cell body.

The cap insert may further include an orifice extending from the recess through the cap insert, wherein the orifice is configured to provide external fluid communication with the cell body.

An extraction cell assembly may include a cap insert, a cell body defining a cell chamber, a cap body including a throughbore and a peripheral wall, a bed support removably received within the recess, and a seal removably received within the throughbore, wherein the seal forms a fluid seal between the cell body and the cap assembly when the cap assembly is secured to the cell body.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the inventions) will be described in conjunction with exemplary embodiments, it will be understood that present description is not intended to limit the inventions) to those exemplary embodiments. On the contrary, the inventions) is/are intended to cover not only the exemplary embodiments, but also various alternatives, modifications, equivalents and other embodiments, which may be included within the spirit and scope of the invention as defined by the appended claims.

In accordance with the present invention, an extraction cap assembly is configured to allow easy removal and replacement of a seal and a bed support, and specifically configured to allow a user to do so without tools.

Figure 6:
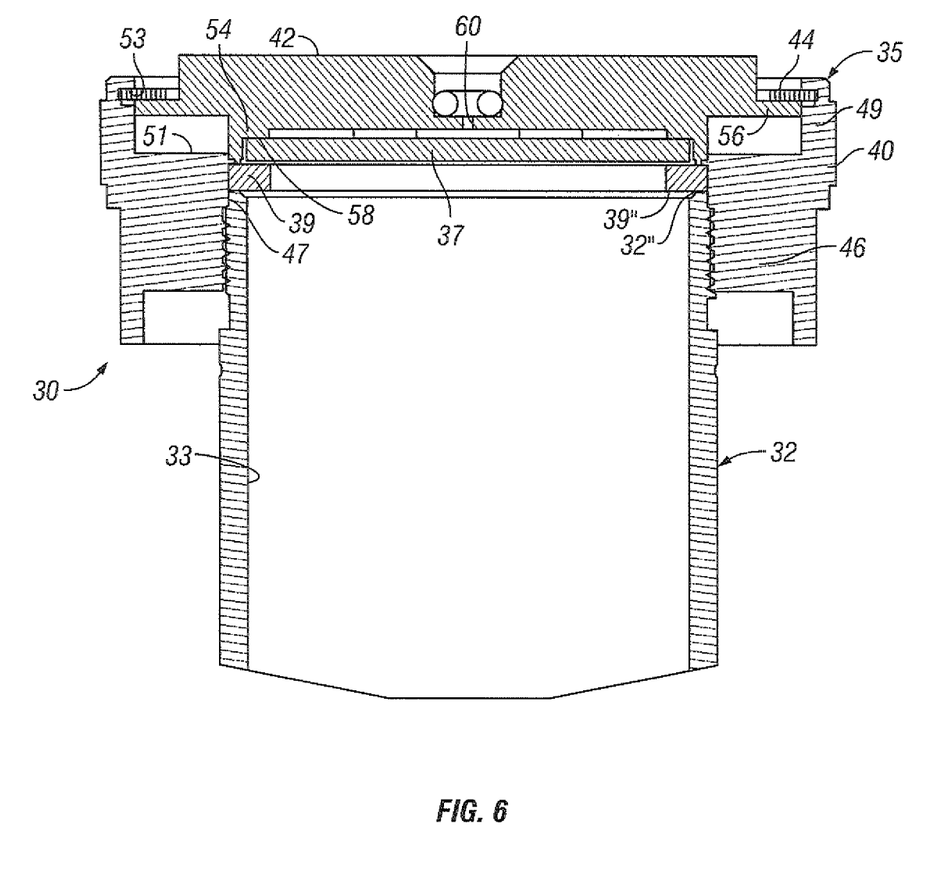
FIG. 6 is a cross-sectional view of the exemplary extraction cell assembly of FIG. 3 mounted on a cell body in accordance with the present invention, taken along line 6-6 of FIG. 5.
Figure 7:
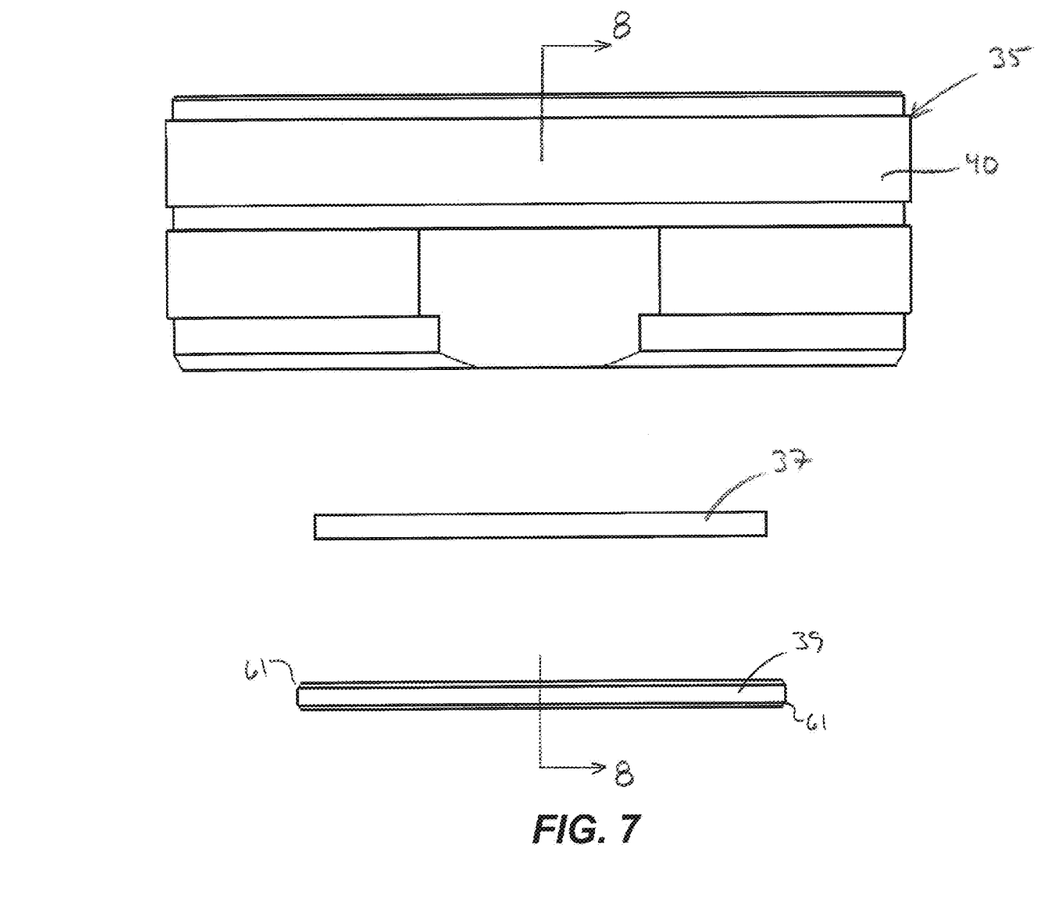
FIG. 7 is a side view of the exemplary extraction cell assembly of FIG. 3, shown removed from cell body with a seal and a bed support released therefrom in accordance with the present invention.

Turning now to the drawings, wherein like components are designated by like reference numerals throughout the various figures, attention is directed to FIG. 6, which shows an upper end of an exemplary extraction cell assembly in accordance with the present invention. The extraction cell assembly, generally designated 30, includes a cell body 32 that defines a cell chamber 33 that houses a sample for extraction, and a cap assembly 35 that is removably secured to an end of the cell body to enclose the cell body and provide a sample chamber that is suitable for use at elevated temperatures and pressures. The extraction cell assembly also includes a bed support 37 in the form of a filter or frit and this received within the cap assembly. In various embodiments, the filter is a frit formed of porous stainless steel, however, one will appreciate that other suitable filter elements and/or materials may be utilized in accordance with the present invention. In accordance with the present invention, the body support is releasably secured within the cap assembly by a seal 39.

The cap assembly of the present invention is generally made of three discrete parts, a threaded cap body 40, a floating cap insert 42 and a retaining ring 44. In various aspects, the cap insert has similar sealing features as current designs, for example, similar sealing features as the insert member 16 described in U.S. Pat. No. 5,647,976 to Rothe et al, the entire content of which is incorporated herein for all purposes by this reference. Such sealing features insure compatibility between the cap assembly 35 of the present invention with existing cell bodies that are currently used on existing systems, including, but not limited to the Thermo Scientific Dionex™ ASE™ 150 and 350 Accelerated Solvent Extractors provided by Thermo Scientific Dionex of Sunnyvale, Calif.

Cap body 40 generally includes a threaded base 46 having a precision throughbore 47 that extends axially therethrough, a peripheral wall 49 that extends from an annular step 51 of the threaded base, and a retaining groove 53 that is dimensioned and configured to releasably receive retaining ring 44.

Cap insert 42 generally includes a plunger 54 and a peripheral flange 56, which respectively fits into the precision throughbore 47 in the threaded base of cap body 40. The cap insert is held in place with retaining ring 44. The cap insert also includes a recess 58 that is dimensioned and configured to receive and located bed support 37 within the cap assembly such that fluid flowing through orifice 60 into cell chamber 33 must pass through the bed support. Orifice 60 in conjunction with another seal is configured to receive a nozzle that can dispense solvent and also form a gas-tight closure while the extraction assembly is heated.

Cap insert 42 can axially reciprocate within the throughbore: its outward movement (e.g., upward movement in FIG. 6) limited by retaining ring 44; and its inward movement (e.g., downward in FIG. 8) limited by annular step 51. This axial movement allows cap insert 42 to properly seat and clamp seal 39 against cell body 32 as the cap assembly is threaded upon the cell body for proper sealing during high pressure extraction, and allows easy removal of seal 39 and bed support 37 by the user by simply pressing cap insert 42 into cap body 40, as will become evident below.

In various embodiments, cap body 40 and the cap insert 42 are preferably metallic in composition, and more preferably stainless steel, however, one will appreciate that other suitable materials may be used in accordance with the present invention. In order to lessen the possibility of galling or seizing, the cap body and the cap insert may be formed of different materials. For example, the cap body may be formed of a conventional 300 series stainless steel and the cap insert may be formed of a different austenitic stainless steel such as Nitronic® 60, and vice versa. Alternatively or in addition to, the cap body and/or cap insert may be provided with an anti-gall coating or compound to lessen the possibility of galling or seizing.

In the illustrated embodiment, seal 39 is an annular seal formed of polyether ether ketone (PEEK). One will appreciate that other configurations and materials may be used in accordance with the present invention. For example, the seal may be non-circular provided that it is geometrically shaped to mate with a corresponding cell body. Similarly, the seal is preferably formed of PEEK, however, one will appreciate that other thermoplastic polymers and/or other suitable materials may be used that are capable of providing fluid-tight seal in high-temperature and/or high pressure applications. In the illustrated embodiment, seal 39 includes a first upper surface 39' that abuts against a lip 54' of plunger 54 and a second lower surface 39" that abuts against an end 32" of the cell body 32.

Seal 39 is designed to be a light press fit into throughbore 47 within cap body 40, that is, the seal is designed for a frictional interference fit with the throughbore. Such a press fit keeps seal 39 in place during installation of cap assembly 35 onto cell body 32. In accordance with the present invention, when cap assembly 35 and seal 39 are used in accelerated solvent extractions, they are subjected to high pressure, temperatures and solvents. For example, in Accelerated Solvent Extraction (ASE) applications, the cap assembly and seal are preferably configured to withstand temperatures of approximately 25° C. to 300° C., more preferably approximately 100° C. to 250° C., and more preferably approximately 100° C. to 200° C.), and pressure ranges of approximately 10 psi to 10,000 psi, more preferably approximately 100 psi to 2000 psi, and most preferably approximately 100 psi. Such elevated temperatures and pressures generally cause seal 39 to deform over time. The geometry of the cap assembly together with a chamfer 61 on seal 39 is designed to insure that when the seal deforms, it still seals correctly and without causing the seal to lock into place within throughbore 47, thus facilitating the release of the seal as it is pushed out by plunger 54.

Figure 8:
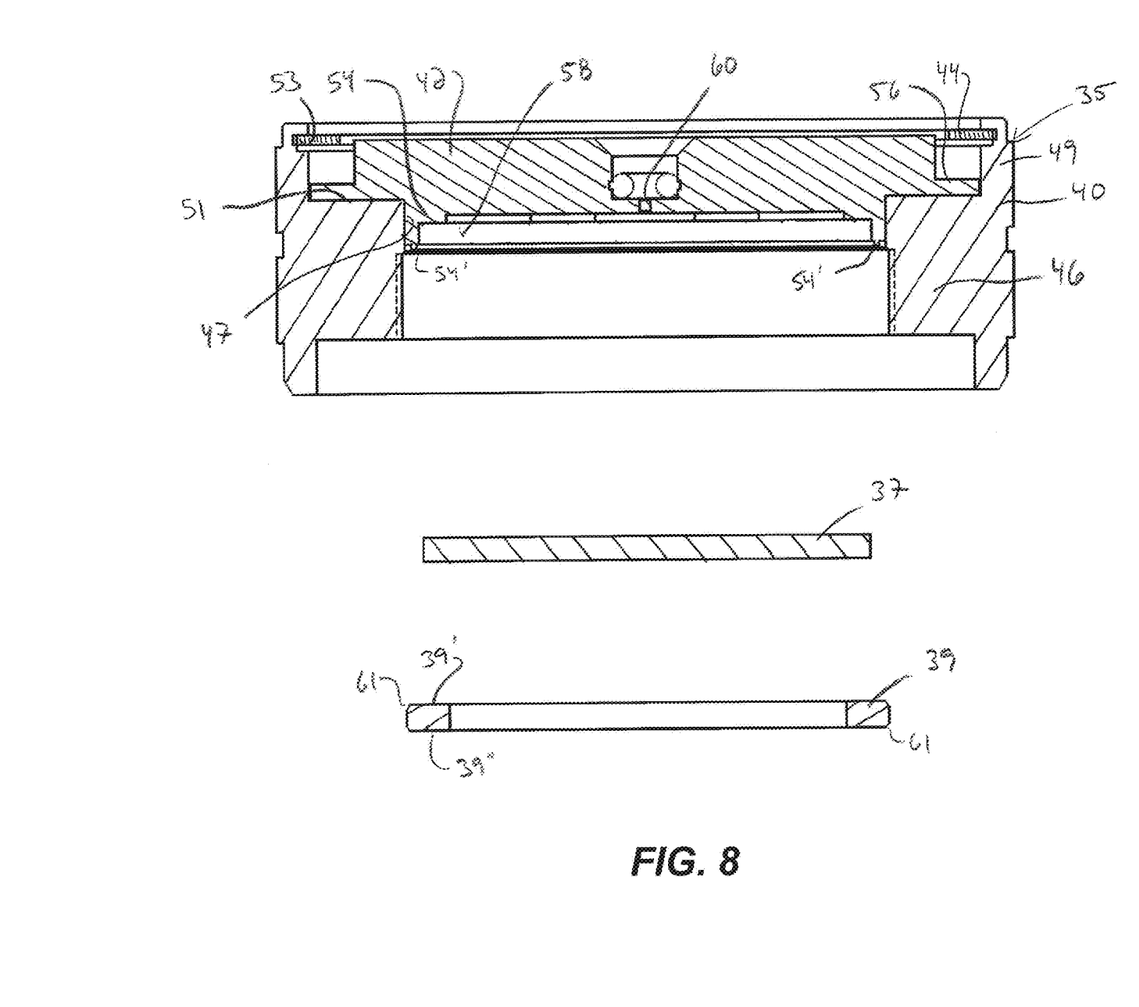
FIG. 8 is a cross-sectional view of the exemplary extraction cell assembly of FIG. 3, shown removed from cell body and having released a seal and body support in accordance with the present invention, taken along line 8-8 of FIG. 7.

In operation and use, the extraction cell assembly and cap assembly of the present invention is configured such that no special tools are needed to disassemble the cap assembly. A user can readily install and remove the seal and/or bed support by hand with ease. To install seal 39 and bed support 37, a user only has to place the bed support in recess 58 of the cap insert, then install the seal with minimal effort with one's fingers or thumbs pushing the seal into throughbore 47 of the cap body. The interference fit between seal 39 and cap body 40 keeps bed support 37 in place in the cap insert, as shown in FIG. 6. The user may then screw the cap assembly tightly onto cell body 32 to fully seat seal 39 into place. To remove seal, the user removes the cap assembly pushes on cap insert to push seal 39 and bed support 35 out of throughbore 47 as shown in FIG. 8.

A significant advantage of the extraction cell assembly of the present invention is that it may be used in a number of existing devices, including but not limited to the Thermo Scientific Dionex™ ASE™ 150 and 350 Accelerated Solvent Extractors. Also, the cap assembly of the present invention is similarly compatible with current cell bodies.

Extensive testing has been performed with different temperatures and solvents to insure functionality of this design under various exemplary user methods. A short summary is presented for the following examples.

EXAMPLE 1

The performance of an exemplary extraction cell assembly was tested to determine under various Accelerated Solvent Extraction (ASE) conditions. Example 1 was performed using various cell bodies with cap assemblies in a Thermo Scientific Dionex™ ASE™ 350 Accelerated Solvent Extractor at different temperatures and solvents to ensure the functionality of the new design under a variety of user methods. The cells were filled with sand for all the extractions and conducted with the following control parameters: temperature of 60° C. to 200° C.; static time of 5 minutes; one cycle; 10% flush; and a 90 second purge. Table 1 shows that the cap assembly showed good extraction performance under high temperature and pressure conditions and all extractions were leak free. Removal of the seal was easy.

TABLE 1

Performance test extraction cell assembly

| Cell Size mL | Solvent | Extraction Temperature ° C. | Result |
|---|---|---|---|
| 34 | Hexane | 80 | Leak free extraction |
| 34 | Hexane | 100 | Leak free extraction |
| 34 | Hexane | 125 | Leak free extraction |
| 34 | Hexane | 150 | Leak free extraction |
| 34 | Hexane | 175 | Leak free extraction |
| 34 | Hexane | 200 | Leak free extraction |
| 34 | Acetone | 100 | Leak free extraction |
| 34 | Dichloromethane | 100 | Leak free extraction |
| 22 | Dichloromethane | 60 | Leak free extraction |
| 22 | Dichloromethane | 100 | Leak free extraction |
| 10 | Dichloromethane | 100 | Leak free extraction |
| 66 | Hexane | 100 | Leak free extraction |
| 100 | Hexane | 100 | Leak free extraction |

EXAMPLE 2

Analyte recovery from ASE extraction was also studied using a Thermo Scientific Dionex™ ASE™ 350 Accelerated Solvent Extractor. Fat extraction from corn chips was pursued using the solvent hexane with the following control parameters: temperature of 100° C.; static time of 5 minutes; one cycle; 30% flush; and a 90 second purge. The solvent was evaporated and the fat was measured by gravimetry. The recovery results are shown in Table 2 comparing the results using an existing sample cell enclosed with an existing end cap versus an existing sample cell enclosed by an exemplary cap assembly in accordance with the present invention. The results indicated comparable performance.

TABLE 2

Fat extraction with 34 mL cell body

| % Recovery Existing end cap, n = 3 | % Recovery Exemplary cap assembly, n = 3 |
|---|---|
| 96.3 | 96.2 |

The removal of seal from the exemplary cap assembly of the present invention was easier as compared to the existing end cap, particularly after several extractions were pursued.

For convenience in explanation and accurate definition in the appended claims, the terms "upper" or "upward", "downward", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An extraction cell assembly comprising:
a cell body defining a cell chamber;
a cap assembly including: a cap body removably secured to the cell body, the cap body including a throughbore and a peripheral wall; and a cap insert including a plunger, a peripheral flange extending outwardly from the plunger, and a recess disposed within the plunger, the flange and the plunger of the cap insert slidably received, respectively, inside the peripheral wall and throughbore of the cap body;
a bed support removably received within the recess; and
a seal removably received within the throughbore, wherein the seal forms a fluid seal between the cell body and the cap assembly when the cap assembly is secured to the cell body;
wherein pressing the plunger into the throughbore of the cap body pushes the seal out of the throughbore of the cap body.

2. An extraction cell assembly according to claim 1, wherein the cap body is threadably secured to the cell body.

3. An extraction cell assembly according to claim 1, further comprising an orifice extending from the recess through the cap insert to provide external fluid communication with the cell chamber.

4. An extraction cell assembly according to claim 1, further comprising a retaining ring for locking the peripheral flange of the cap insert within the peripheral wall of the cap body.

5. An extraction cell assembly according to claim 1, wherein the bed support is a frit.

6. An extraction cell assembly according to claim 1, wherein the seal is formed of a thermoplastic polymer.

7. An extraction cell assembly according to claim 6, wherein the seal is formed of polyether ether ketone (PEEK).

8. An extraction cell assembly according to claim 1, wherein the seal is an annular seal including a first surface abutting against a lip of the plunger surrounding the recess, and a second surface abutting against an end of the cell body.

9. An extraction cell assembly according to claim 1, wherein the seal frictionally engages the throughbore to secure the bed support within the recess.

10. An extraction cell assembly according to claim 9, wherein pressing the plunger into the throughbore of the cap body pushes the seal out of frictional engagement with the throughbore thereby releasing the bed support.

11. A cap assembly comprising:
a cap body configured to be removably secured to a cell body, the cap body including a throughbore and a peripheral wall;
a cap insert including a plunger, a peripheral flange extending outwardly from the plunger, and a recess disposed within the plunger, the flange and plunger of the cap insert slidably received, respectively, inside the peripheral wall and throughbore of the cap body;
a retainer for locking the peripheral flange of the cap insert within the peripheral wall of the cap body; and
a removable seal frictionally engaging the throughbore;

wherein the recess is configured to removably receive a bed support therein;

wherein seal is configured to secure the bed support within the recess, whereby the plunger is configured to remove the seal by pushing the seal from the throughbore; and wherein the cap assembly is configured to position the seal to form a fluid seal with the cell body when the cap assembly is secured to the cell body.

12. A cap assembly according to claim 11, wherein at least one of the cap body and the cap insert are formed of stainless steel.

13. A cap assembly according to claim 11, wherein one of the cap body and the cap insert are formed of a first stainless steel, and the other of the cap body and the cap insert are formed of a second stainless steel different than the first stainless steel.

14. A cap assembly according to claim 11, further comprising the bed support, in which the bed support is a frit.

15. A cap assembly according to claim 11, wherein the seal is formed of a thermoplastic polymer.

16. A cap assembly according to claim 15, wherein the seal is formed of polyether ether ketone (PEEK).

17. A cap assembly according to claim 15, wherein the seal is an annular seal including a first surface abutting against a lip of the plunger surrounding the recess.

18. A cap assembly according to claim 11, the cap assembly further comprising the bed support, in which the bed support is removably received in the recess, wherein pressing the plunger into the throughbore of the cap body pushes the seal out of frictional engagement with the throughbore thereby releasing the bed support.

19. An extraction cell assembly comprising:

a cap insert for use with a cap assembly including a retainer and a cap body configured to be removably secured to a cell body, the cap insert comprising:

a plunger configured to be slidably received by a throughbore of the cap body;

a peripheral flange extending outwardly from the plunger and configured to be slidably received within a peripheral wall of the cap body and removably retained within the peripheral wall by the retainer; and a recess disposed within the plunger and configured to removably receive a bed support therein;

wherein the plunger is configured to remove a seal frictionally engaged within the throughbore of the cap body by pushing the seal from the throughbore when the cap insert is pushed into the cap body; and wherein the plunger is configured to position the seal to form a fluid seal with a cell body when the cap assembly is secured to the cell body;

the cell body defining a cell chamber;

the cap body including the throughbore and the peripheral wall;

the bed support removably received within the recess; and the seal removably received within the throughbore, wherein the seal forms the fluid seal between the cell body and the cap assembly when the cap assembly is secured to the cell body.

* * * * *